United States Patent Office 3,535,352
Patented Oct. 20, 1970

3,535,352
SOLDER FLUX WHICH LEAVES CORROSION-RESISTANT COATING
James E. Webb, Administrator of the National Aeronautics and Space Administration, with respect to an invention of Albert Bauman, Sierra Madre, Calif.
No Drawing. Original application May 21, 1965, Ser. No. 457,879, now Patent No. 3,357,093, dated Dec. 12, 1967. Divided and this application Aug. 22, 1967, Ser. No. 681,942
Int. Cl. C09f 1/00
U.S. Cl. 260—404.5                                  4 Claims

ABSTRACT OF THE DISCLOSURE

A soldering flux based on the hydrazine salts of perfluoro alkanoic acids.

---

This application is a divisional application of application Ser. No. 457,879, filed May 21, 1965 now U.S. Pat. 3,357,093, Dec. 12, 1967 in the name of James E. Webb, administrator, National Aeronautics and Space Administration.

This invention relates generally to a new solder flux useful in the joining of metals such as copper.

It is important in many applications that a soldered joint should not be the source of corrosion or be subject to corrosion. The avoidance of corrosion is particularly important where sterility must be maintained, such as in space capsules. However, the numerous soldered joints in the electronic components in a space craft provide a possible source of unwanted corrosion. Various soldering fluxes have been developed, which leave little or no corrosive resinous residue. Typical of such commercially available fluxes are those based on the inorganic acid salts of hydrazine. While these fluxes do not generate any corrosive residues, they are themselves subject to attack by foreign material.

Accordingly, it is a principal object of this invention to provide a solder flux which leaves a corrosion-resistant coating on the soldered area.

More particularly, it is an object of this invention to provide a novel soldering flux based on the hydrazine salts of perfluoro alkanoic acids.

In another aspect, it is an object of this invention to provide a soldering flux which is particularly adapted for use with lead-tin solder.

Yet another object of this invention is the provision of a solder material particularly useful in the soldering of copper and similar alloys or metals.

These, and other objects of the invention, it is believed, will become apparent from the more detailed description which follows.

Briefly, the present invention involves soldering in the presence of a novel fluxing agent which is hydrazine monoperfluoro alkanoate. More particularly, the invention comprehends the method of soldering a metal in the presence of an effective fluxing amount of hydrazine monoperfluoro alkanoate, to leave a soldered area containing a corrosion resistant inert polymeric coating. The invention also comprehends the novel fluxing agents, and their method of preparation.

It has been found that the polymer coating provided by the fluxes of the present invention tenaciously adheres to the soldered surface. In addition, the polymeric material has been found to be resistant to the effect of strong chemicals, acids, and the like. While not bound by any theory, it is believed that the polymeric material present is generally in the form of an oriented monolayer of a fluorocarbon polymer.

In general, the novel hydrazine monoperfluoro alkanoates used as the flux in the present invention, are long chain materials containing at least four and up to about twenty carbon atoms. More preferably, the materials contain from about seven to about sixteen carbon atoms. Typical novel fluxing agents of this invention include hydrazine monoperfluoro hexanoate, hydrazine monoperfluoro decanoate, hydrazine monoperfluoro dodecanoate, hydrazine monoperfluoro tridecanoate, hydrazine monoperfluoro hexadecanoate, and hydrazine monoperfluoro eicosanoate.

The fluxing materials of this invention are particularly adapted for use with lead-tin solder, wherein the ingredients are present in a 60/40 weight ratio, respectively. However, as will be apparent to those skilled in the art, the fluxing materials have applicability to other soldering materials. Some of the other solder useful with the fluxes of this invention are as follows: 30/70 tin-lead, 30/70 tin-zinc, 60/40 zinc-cadmium, 85/15 tin-zinc, 30/70 tin-zinc containing a small amount of antimony, and 30/70 tin-zinc containing a small amount of copper.

The novel fluxing materials of this invention may be prepared by neutralizing an aqueous solution of a perfluoro alkanoic acid with hydrazine, most conveniently at room temperature, in accordance with the following general reaction equation:

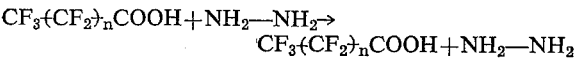

$$CF_3{\text{-}}(CF_2)_n COOH + NH_2{\text{---}}NH_2 \rightarrow CF_3{\text{-}}(CF_2)_n COOH + NH_2{\text{---}}NH_2$$

wherein $n$ is an integer.

The following example illustrates the invention. In the example, the parts and percentages are by weight unless otherwise indicated.

EXAMPLE

Hydrazine monoperfluoro octanoate was prepared by adding neat hydrazine to an aqueous solution of perfluoro octanoic acid (sold under the designation FC–26 by Minnesota Mining and Manufacturing Company) in the presence of methyl red indicator to a pH 7. The salt, which was a white wax, was recovered by evaporation of the water. The hydrazine monoperfluoro octanoate was then applied to a copper joint and heated; then molten lead/tin (60/40) was applied and the soldering completed. The hydrazine monoperfluoro octanoate proved to be an excellent flux, giving a zero contact angle, and providing a strong joint. The finished joint was found to be coated with a thin adherent layer of a fluorocarbon polymer which was corrosion resistant, and impervious to strong acid. When the hydrazine monoperfluoro octanoate was heated alone on a copper sheet to its melting point, the treated surface subsequently resisted corrosion by hydrogen chloride vapor.

When the foregoing example was repeated using hydrazine monoperfluoro myristate, a corrosion-resistant strong soldered joint was obtained.

While the fluxing agent of this invention is particularly adapted to the soldering of copper, it will be readily appreciated by those skilled in the art that my invention has application of a wide variety of metals and metal alloys.

Having fully described the invention, it is intended that it be limited solely by the lawful scope of the appended claims.

I claim:
1. A soldering flux consisting of a hydrazine monoperfluoro alkanoate capable of providing a corrosion-resistant polymeric coating adhered to a soldered surface, said hydrazine monoperfluoro alkanoate containing from four to about twenty carbon atoms.
2. The soldering flux of claim 1 in which said hydra- zine monoperfluoro alkanoate contains from seven to sixteen carbon atoms.

3. The soldering flux of claim 1 in which said hydrazine monoperfluoro alkanoate is hydrazine monoperfluoro octanoate.

4. The soldering flux of claim 1 in which said hydrazine monoperfluoroalkanoate is hydrazine monoperfluoro myristate.

References Cited

UNITED STATES PATENTS

| | | | |
|---|---|---|---|
| 2,827,471 | 3/1958 | Gavlin et al. | 260—404 |
| 2,927,941 | 3/1960 | MacMillan | 260—404 |
| 3,220,892 | 11/1965 | Durham | 148—23 |
| 3,223,561 | 12/1965 | Durham | 148—23 |
| 3,232,970 | 2/1966 | Hauptschein et al. | 260—404 |
| 3,271,430 | 9/1966 | Teumac | 260—404.5 |
| 3,357,093 | 12/1967 | Webb | 117—52 |

OTHER REFERENCES

Nussberger: "Material for Soft Soldering of Aluminum and Its Alloys" (1964), CA 62, p. 10194 (1965).

Asami: "Soldering Flux" (1957), CA 52, p. 16176 (1958).

LEWIS GOTTS, Primary Examiner

G. HOLLRAH, Assistant Examiner

U.S. Cl. X.R.

260—501.16